United States Patent

Haller

[15] 3,682,315
[45] Aug. 8, 1972

[54] CARTRIDGE TYPE COLUMN FOR TREATMENT OF LIQUID STREAMS AND SUBSTRATE ENCLOSURE THEREFOR

[72] Inventor: Wolfgang Haller, 5400 Pooks Hill Rd., Linden Hill, Apt. 912, Bethesda, Md. 20014

[22] Filed: Oct. 20, 1969

[21] Appl. No.: 867,704

[52] U.S. Cl. ............... 210/233, 210/266, 210/282, 210/446, 210/477, 128/272
[51] Int. Cl. ............................................. B01d 13/00
[58] Field of Search .......... 210/20, 23, 235, 232, 473, 210/474, 266, 282, 446, 453, 233; 128/272, 218 DA

[56] References Cited

UNITED STATES PATENTS

| 1,436,294 | 11/1922 | Scott | 210/473 |
| 1,581,947 | 4/1926 | Hobbs | 210/473 |
| 2,570,639 | 10/1951 | Cahan | 210/266 X |
| 2,817,337 | 12/1957 | Herzig | 128/272 |
| 2,924,336 | 2/1960 | Fulton | 210/450 |
| 3,221,882 | 12/1965 | Frantz | 210/232 X |
| 3,483,986 | 12/1969 | Wright | 210/232 |

*Primary Examiner*—Reuben Friedman
*Assistant Examiner*—Frederick F. Calvetti
*Attorney*—Christen & Sabol

[57] ABSTRACT

A cartridge type column which eliminates stopcocks by employing self sealing puncturable septum means for connecting the column to the fluid lines.

13 Claims, 10 Drawing Figures

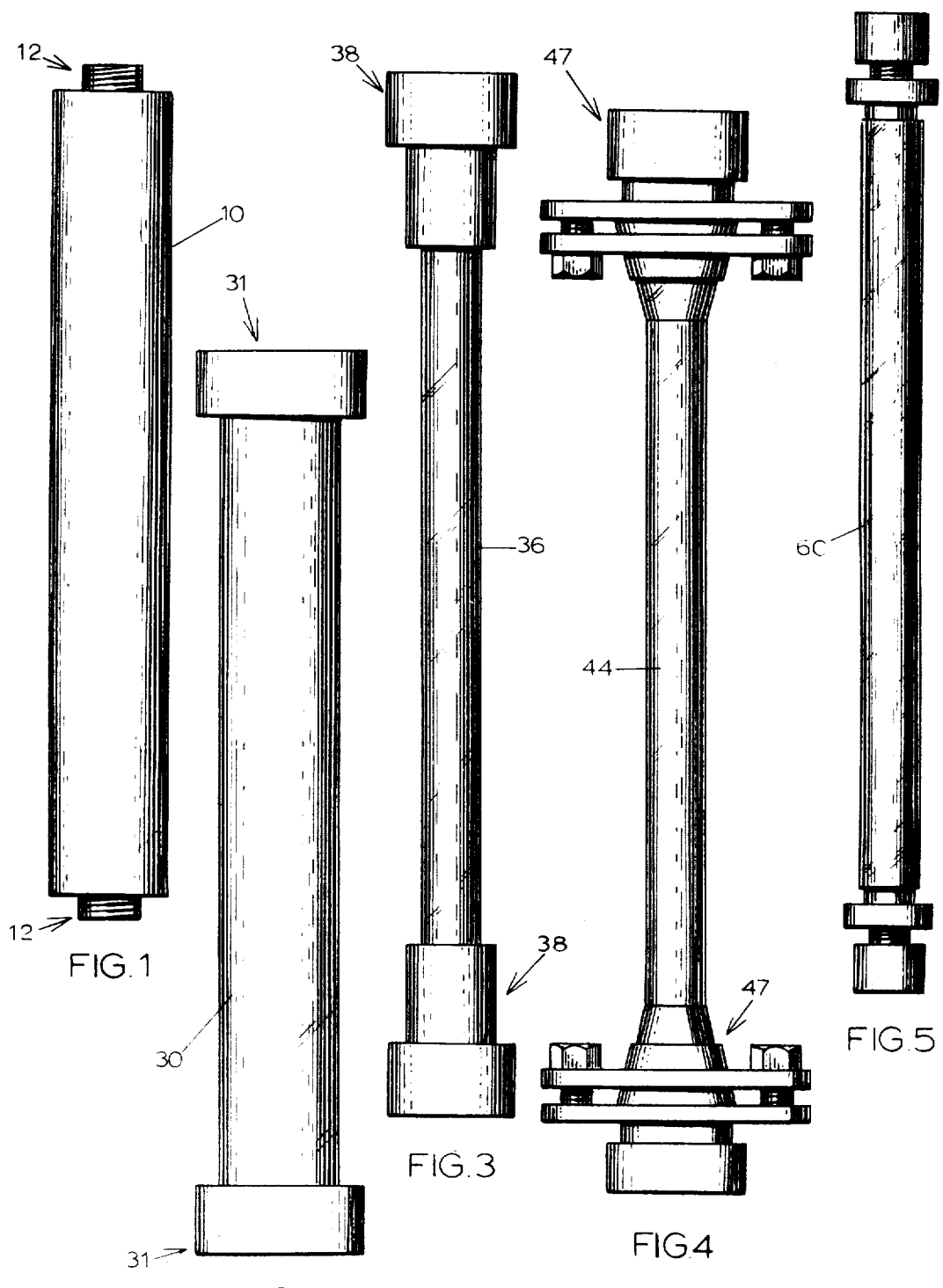

INVENTOR
WOLFGANG HALLER

INVENTOR
WOLFGANG HALLER

CARTRIDGE TYPE COLUMN FOR TREATMENT OF LIQUID STREAMS AND SUBSTRATE ENCLOSURE THEREFOR

A non-exclusive, irrevocable royalty free license to make and use for governmental purposes the invention described herein has been granted to the United States Government.

Numerous analytical and preparative techniques of processing liquid rely upon a solid, particulate stationary phase with which the fluid is brought into contact. Such techniques are for instance the removal of certain fluid components by passing the stream of fluid through a bed of an absorbing solid such as silica gel which retains one or more components. More elaborate processing schemes rely upon the delayed arrival of certain components which they suffer when partitioning between the free fluid of the process stream and the absorbed state on the surface of the solid or between the free fluid of the stream and the fluid in the pores of the solid. In special cases the solid is further modified by having its pores filled with a liquid or some reactive material deposited on its surface. These processing schemes are generally termed chromatography. Other fluid processing techniques use the chemical or catalytic properties of the particulate solid to achieve certain chemical reactions.

It is customary practice to contain the solid phase, also called substrate, in a tubular envelope which is fitted on both ends with a porous plug, disk or screen. The fluid stream is guided through the porous barrier, through the bed of substrate and again through the porous disk at the exit end of the envelope. The disk, plugs or screens have generally a porosity which is wide enough to pass the components of the process stream but small enough to retain the bed of particulate solid contained in between. Such devices are generally called columns.

In numerous operations is it desireable to frequently replace the substrate by a substrate of different material or different porosity, surface area etc. As a matter of fact, certain research operations require that a particular fluid mixture's behaviour on a variety of substrates be tested. In order to do this, hose or tubing connectors are provided at the ends of the columns. In order to prevent the loss of fluid from the disconnected columns one usually provides stopcocks on both ends of columns. In reconnecting the feed and delivery lines it is mostly inevitable that air is introduced in the column. In case of liquid processing, this air forms obstruction in the columns, disturbing the desired even flow pattern through the column.

Another disadvantage of tubing connectors and stopcocks is the fact that they retain fluid in their cavities. After disconnecting and during storage this fluid leaks from the cavities and contaminates the working rooms. This is a particular hazard when working with toxic or infectious materials. The cavities which are exposed to air during storage become furthermore easily contaminated by dust, fungal growth and by bacteria which are later introduced into the process stream when the column is reconnected.

In order to overcome the described disadvantages we have deviced a column which, when not connected to the fluid streams, is fully sealed on both ends by septums of a self-sealing elastomeric material. For connecting the column to the feed-line and the exit-line, both lines are made to terminate in hollow needles, such as hypodermic needles. These needles are pushed through the septums for connecting the column to the lines. Similarly, more than one feed or delivery line can be connected to either end of the column. This is for instance of value if, as in chromatography, sample liquid as well as an eluant liquid have to be introduced into the head of the column. When the needles are withdrawn the column reseals tightly. Thus, by making the septums the only access to the columns one obtains a compact fluid treatment device which can be stored and reconnected without danger of contamination or loss of fluid.

Other objects and advantages will be apparent to those skilled in the art after reading the following specification in connection with the annexed drawings.

In the drawings, FIGS. 1-5 disclose tubular cartridges for containing a substrate, each of the Figures disclosing a different form of end closure for a puncturable septum in accordance with this invention;

Figures 6, 7:
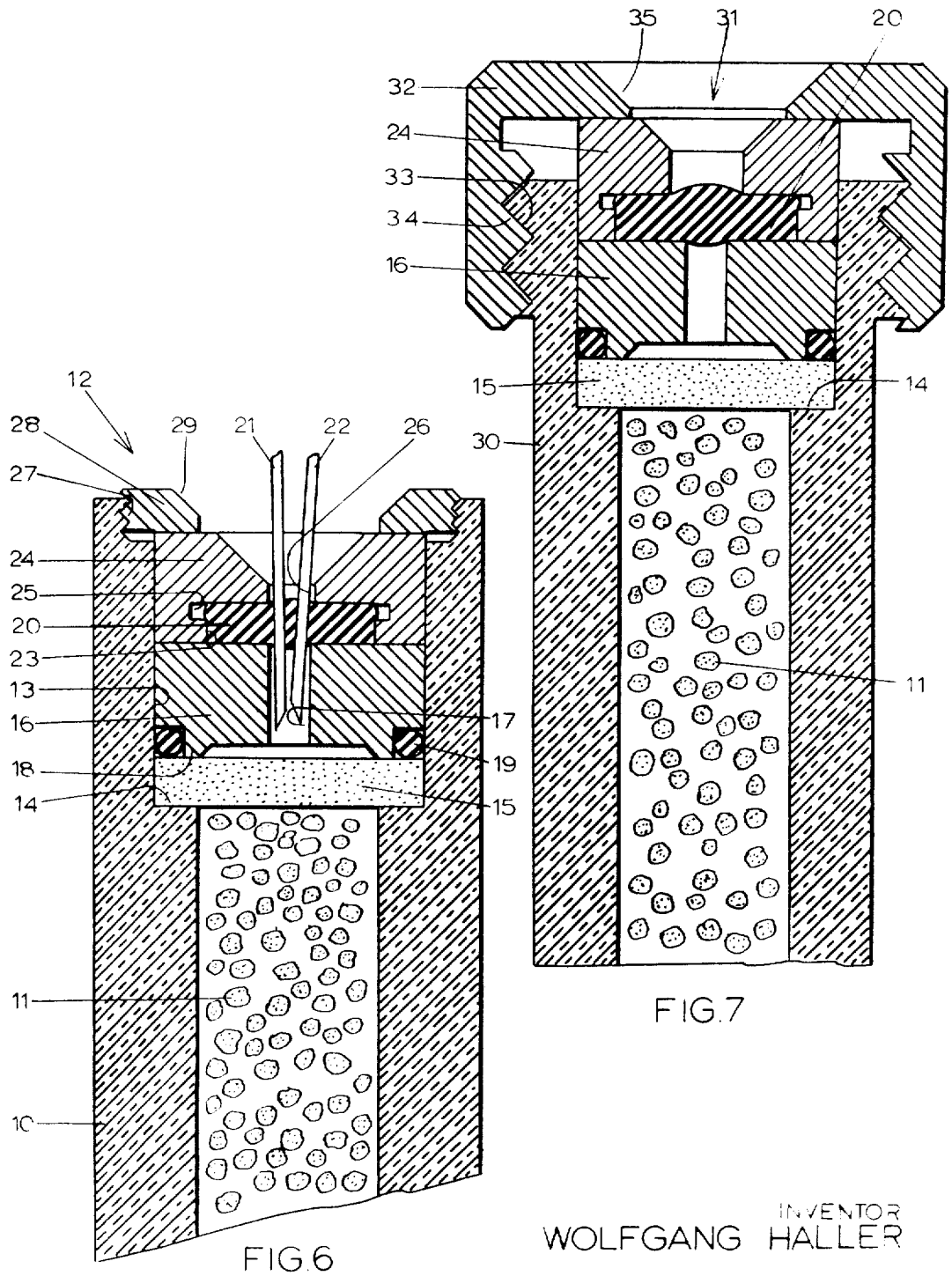
FIG. 6 is a cross-section on an enlarged scale of a preferred form of end closure as shown in FIG. 1 with two hollow needles inserted through the septum of elastomeric material.
FIG. 7 is a cross-section of the end closure shown in FIG. 2.

In FIG. 1 there is shown a preferred form of cartridge which may comprise a transparent tubular envelope 10 which contains a suitable substrate 11 and provide at opposite ends with closures indicated generally by numeral 12 and shown in detail in FIG. 6.

In this case the tubular envelope is counterbored for a short distance, as indicated by numeral 13 to provide an annular internal seat 14 for a porous filter disc 15 upon which there is positioned an annular spacer member 16 having a central passage 17. In addition, the lower radial face of the spacer may be provided with an annular ridge 18 adjacent the periphery which positions a resilient annular sealing member 19, and also provides for a substantial area of the upper surface of the porous disk 15 to be exposed to any fluid introduced into passage 17.

Overlying the spacer and closing the upper end of the passage is a septum means which includes a generally disk-shaped member 20 fabricated of an elastomeric material which may be punctured by a device such as a hollow needle 21 or 22 connected to the fluid lines or to syringes and is capable of re-sealing the opening thus produced when the needle is removed. Such materials are well known in the art and need not be described in detail. Various natural and synthetic rubber materials such as latex or silicones are suitable for the purpose.

Preferably the disk shaped member 20 is mounted within the circular recessed cavity 23 of a holder 24 made of a rigid material and, in order to ensure a tight seal the depth of the cavity in an axial direction may be somewhat less than the unstressed normal thickness of the disk of elastomeric material. In addition, the inner end of the cavity may be provided with an annular outwardly directed recess 25 into which the upper portion of the disk will expand upon tightening. The holder also includes a central passage 26 above the disk which is flared at the upper end to enable a hollow needle to be readily inserted through the disk into the passage 17.

In order to secure the above-mentioned elements in assembled position, the outer end of the tubular member 10 is internally threaded at 27 to receive a flat externally threaded disk-shaped retainer 28 having a flared central aperture 29.

FIG. 2 illustrates a modified form of the invention in which the tubular envelope, indicated by numeral 30, is provided with the end closures, indicated generally by numeral 31, shown in detail in FIG. 7. In this case, the end of the tube has also been counterbored to provide the seat 14 which axially positions the porous disk 15, with the spacer 16, septum 20 and holder 24 as in the previously described form. However, in the form shown in FIG. 7, the holder is retained by a cup-shaped cap 32 which is provided with internal threads 33 for engagement with the exteriorly threaded portion 34 at the end of tube 30, while the tapered aperture in the cap is indicated by numeral 35.

Another modification of the invention is shown in FIG. 3, in which the tubular envelope, indicated by numeral 36, has a plain cylindrical inner wall but is provided at each end with exterior integrally molded threads 37. In this example, the closure means, indicated generally by numeral 38, is readily detachable as a unit, as shown in detail in FIG. 8. The closure means includes a generally cylindrical housing 39, one end of which is internally threaded at 40 for engagement with the threads 37 on the ends of the tube 36 and, just above the threads there is an inwardly directed annular flange 41 which serves as a seat for an annular resilient seal, such as an O-ring 42 and for the porous disk 15. In other respects this form of end closure is similar to that of FIG. 7, in that the spacer 16, with the seal 19, holder 24 and elastomeric septum 20, are retained in place by means of the cap 32 whose internal threads 33 engage with the external threads 43 provided on the upper end of housing 39. Also shown are two puncturing devices 21 and 22 such as hollow needles.

Figure 9:
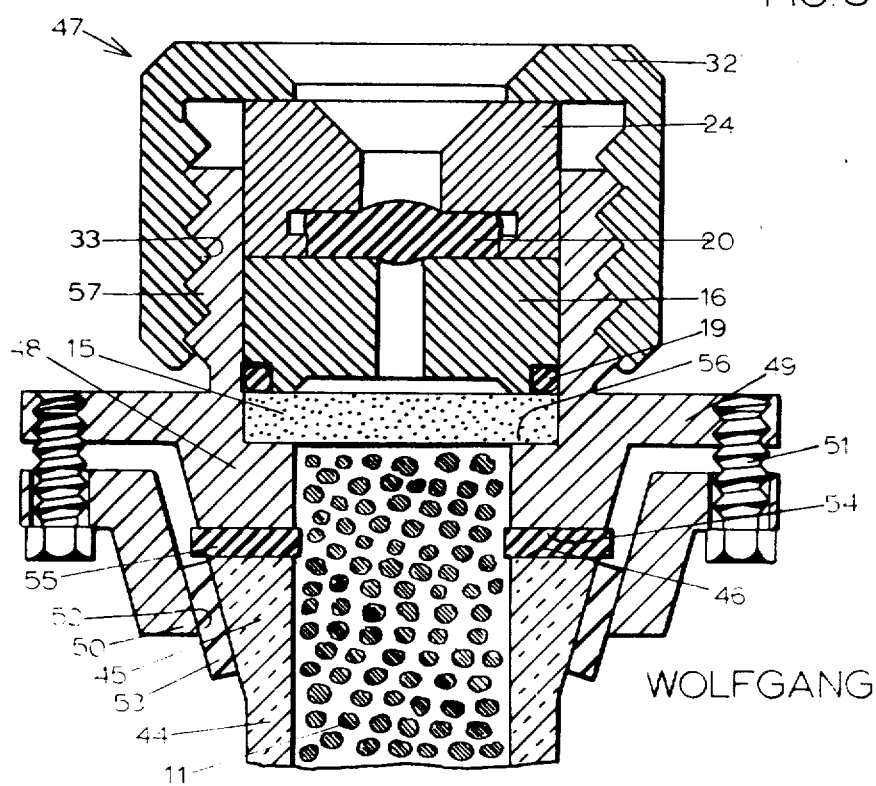
FIG. 9 is a cross-section of the end closure shown in FIG. 4.

Another form of self-contained detachable end closure is shown in FIGS. 4 and 9 wherein a tubular envelope, indicated by numeral 44 is of the type wherein the interior wall is cylindrical from end to end but the outer wall terminates with an outwardly flared conical surface 45 to provide a fairly wide annular flat end wall 46. In this modification of the invention the end closure, indicated generally by numeral 47, includes a cylindrical housing 48, having a radially outwardly projecting flange 49 disposed medially of the ends of the housing to which is secured a conically shaped collar 50, as by means of the adjusting screws 51. The diameter of the smaller opening 52 in the collar should be large enough to clear the widest portion of the tapered end 45 of the tube to permit the collar to be put in place, after which a flexible strip 53 of gasket material is placed between the taper and the collar and the screws 51 drawn up to seat the lower flat end wall 54 of the housing in sealing engagement with an annular flat gasket 55 disposed between the wall 54 and end wall 46 of the tube.

Figure 8:
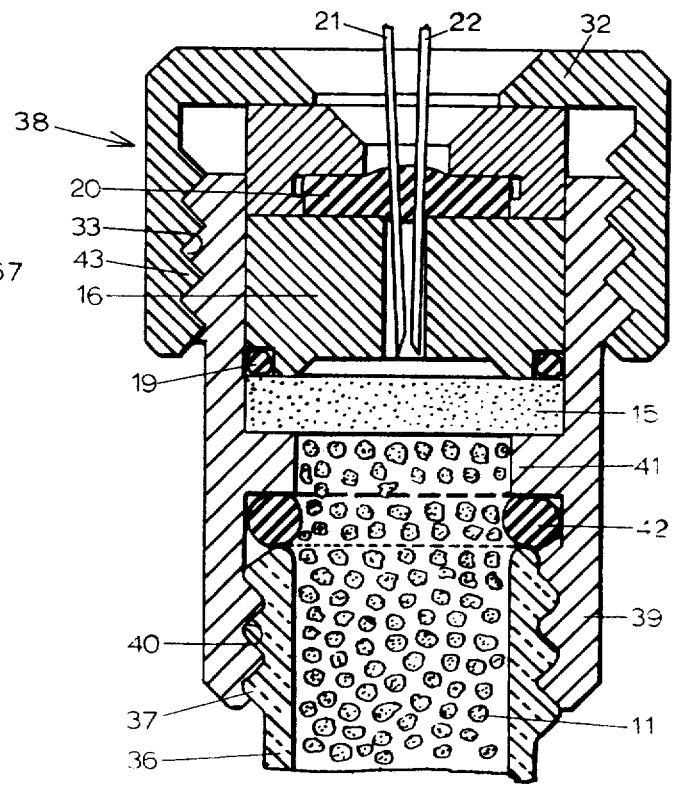
FIG. 8 is a cross-section of the end closure shown in FIG. 3 with two hollow needles inserted through the septum of elastomeric material.

The upper end of the housing is counterbored to provide the annular seat 56 for the porous disk 15 which, in turn, supports spacer 16, with its seal 19, and septum 20 supported in holder 24; these elements being held in place, as in FIGS. 7 and 8, by means of cap 32 whose internal threads 33 engage with the exteriorly threaded portion 57 of the housing.

Figure 10:
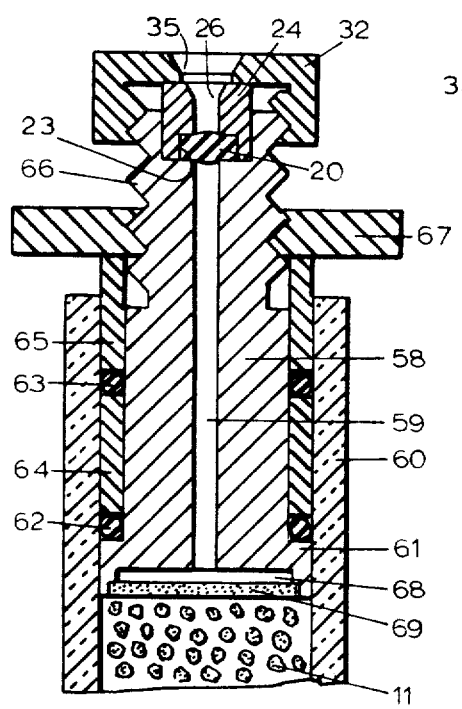
FIG. 10 is a cross-section of the end closure shown in FIG. 5.

In FIG. 10 there is shown another modified form of end closure for use with tubings having plain unthreaded end surfaces as shown in FIG. 5. In this case the housing 58 may consist of an elongated thick-walled cylindrical block of metal, or plastic, having a central passage 59 running along its length. The outside diameter of the housing should be considerable less than the inside diameter of the tubing, indicated by numeral 60, and the lower end is preferably provided with an outwardly projecting annular flange 61 which serves as a seat for a resilient sealing member such as an O-ring 62. Above this there may be positioned another resilient O-ring sealing member 63, while between the two O-rings there is a rigid ring-shaped spacer 64 which is slidable on the exterior of the housing 58 and above the upper O-ring there is another similar spacer 65. The upper portion of the exterior of the housing is threaded, as indicated by numeral 66, to receive a clamping means, such as the internally threaded ring-shaped member 67. Thus, when the device has been inserted into the end of the column 60, it can be firmly positioned and sealed in place by rotating the member 67 to move the spacers 65 and 64 to exert axial pressure on the O-rings 63 and 62 thus expanding them radially between the walls of the housing and the column.

The septum means itself includes a disk-shaped block of puncturable self-sealing material 20 contained within a cavity in the block of rigid material 69 which, in turn, may be received within the cavity 23 in the upper end of the housing and held in place by the internally threaded cap 32. Obviously the cap and block are provided with passages 35 and 26 to permit insertion of one or more needles into the self-sealing disk 20 to admit fluid to the passage 59 in the housing, the lower end of which terminates in the wide cavity 68 which is closed by the porous filter disk 69.

While the material 11 contained in the columns shown in the drawings is a chromatographic substrate such as a bed of granules of porous silica it is contemplated that other types of material for fluid treatment may be enclosed in the column and that their usefulness will be apparent in other types of similar apparatus.

In operation, it will be understood that in all of the modifications of the invention disclosed herein, the particular form of tubular enclosure, or column, chosen serves to confine a granular substrate material 11 within an elongated enclosure for contact with a stream of fluid material in such a way that the substrate may be protected from contact with, or contaminated by, any material either solid, liquid or gaseous other than that desired. This is accomplished because of the fact that either or both, ends of a column is protected by a self-sealing puncturable septum which effectively seals the end of the column whenever a device, such as a hollow needle, is withdrawn; it thus permits the introduction of any desired liquid eluant, or eluants, and/or sample liquid, or liquids into the column, and the withdrawal of effluent therefrom. It will also be obvious that the substrate 11 may comprise materials which are not merely adsorptive of the stream of fluid passing through the column but may be reactive with respect to such fluids either so as to combine with, or catalytically affect such fluid streams.

I claim:

1. Apparatus for treating liquid streams comprising a bed of substrate enclosed in a tubular body, said body terminating at both ends by porous disks, two puncturable, self-sealing elastomeric septums each of which is coaxially and distally spaced from each of said porous disks for sealing the interior of the tubular body from the atmosphere, means for positioning the porous disks, means for positioning the septums and means for spacing the septums, said means for positioning the porous disks and the septums comprising a hollow housing at both ends of said tubular body and having an internal annular shoulder to restrict axial proximal movement of the porous disk, a removable annular body to restrict axial distal movement of the septum, an annular spacer to keep the septum and the porous disk in spaced relation, a resilient O-ring for said spacer, said removable annular body being provided with a proximal recess to accept the septum, said body having a depth slightly less than the normal thickness of the septum, said removable annular body also being provided with an axial cavity sufficiently large to accept at least two hollow needles which may penetrate the septum and distal transverse faces for abutting and sealing relationship with one side of the septum and a proximal face in abutting relationship to the porous disk, the face of said spacer being provided with a shoulder to accept the resilient O-ring for sealing the spacer against the interior of the housing, and means to secure the annular body, septum, spacer disk and porous disk in each end of said housing.

2. Apparatus as defined in claim 1, said substrate being a chromatographic substrate.

3. Apparatus as defined in claim 1, said substrate being an adsorption medium.

4. Apparatus as defined in claim 1, said substrate being capable of reacting with at least one of the components of a liquid stream.

5. Apparatus as defined in claim 1, said substrate being capable of inducing chemical reactions within a liquid stream.

6. Enclosure as defined in claim 1, wherein said removable annular body is held in place by rings with outside threads which engage with inside threads provided in said hollow housing.

7. Enclosure as defined in claim 1, wherein said removable annular body is held in place by a cup-shaped cap having an axial cavity provided with internal threads to engage with external threads of the housings.

8. Enclosure as defined in claim 1, wherein said hollow housing is detachably and sealingly fastened to said tubular body.

9. Enclosure as defined in claim 8, wherein said housing is fastened to said tubular body by means of engaging threads and gasket means.

10. Enclosure as defined in claim 8, wherein said housing is fastened to said tubular body by means of bolted flanges and gasket means.

11. Enclosure as defined in claim 8, wherein said housing includes a first elongated cylindrical element disposed in telescopic relationship to said tubular body, clamping means threadedly connected with said first cylindrical element for axial movement with respect thereto, said first cylindrical element and said clamping means each being provided with a radially projecting opposed complementary surface defining with said first cylindrical element an annular groove having variable width, and a resilient O-ring disposed in said annular groove and being radially expandable for sealing engagement with said tubular body in response to a decrease in the width of said annular groove caused by axial movement of the clamping means.

12. Enclosure as defined in claim 11, wherein one end of the first cylindrical element is provided with an annular outwardly projecting flange defining one opposed surface of said annular groove, and said clamping means includes a second cylindrical element having one end defining the other opposed surface of said annular groove slidably mounted on the exterior of the housing for radially expanding said O-ring.

13. Enclosure as defined in claim 12, wherein said clamping means includes second and third cylindrical elements slidably mounted on the exterior of the housing, one end of the third cylindrical element and the other end of the second cylindrical element defining with said first cylindrical element a second annular groove having variable width, and a second resilient O-ring disposed in said second annular groove for sealing engagement with said tubular body in response to said axial movement of the clamping means.

* * * * *